United States Patent [19]
Duer

[11] Patent Number: 5,429,377
[45] Date of Patent: Jul. 4, 1995

[54] SANITARY PROTECTIVE COVERS FOR SHOPPING CART USE

[76] Inventor: Sandra D. Duer, Rte. 5 - Box 5234, East Stroudsburg, Pa. 18301

[21] Appl. No.: 171,066

[22] Filed: Dec. 21, 1993

Related U.S. Application Data

[63] Continuation-in-part of Ser. No. 47,689, Apr. 15, 1993.

[51] Int. Cl.⁶ .................................................. B62B 3/02
[52] U.S. Cl. ........................... 280/33.992; 150/154
[58] Field of Search ................... 280/33.991, 33.992, 280/33.993, DIG. 4, 304.1, 321.3; D6/575, 579, 580; 220/408, 410, 470; 297/227; 150/154, 165, 166, 155; 201/235; 160/84.1; 206/825; 248/251, 252; 4/608, 609

[56] References Cited

U.S. PATENT DOCUMENTS

| | | | |
|---|---|---|---|
| 2,803,849 | 8/1957 | Peters | 280/33.992 |
| 3,866,649 | 2/1975 | Bringman | 280/33.992 |
| 5,215,319 | 6/1993 | Farris | 280/33.992 |

*Primary Examiner*—Richard M. Camby
*Attorney, Agent, or Firm*—Charles A. Wilkinson

[57] ABSTRACT

A sanitary wrapping for covering the handles of shopping carts is provided. The wrapping may be provided either in the form of a portable wrapping which can be carried from store to store by the individual shopper and attached to the handles of shopping carts in the store by various adhesive arrangements along the edges or as disposable or recyclable coverings obtained and used in each store. The preferred fastening means takes the form of so-called Velcro fastened wrappers. Various improvements of the basic tubular sanitary protection can be provided, including the use of flaps on the ends to cover more of the handle and sides of the shopping cart, plus slits in the structure of the handle covering so it can be adapted to handles of various lengths. A preferred form incorporates a coupon pouch into which the entire covering may be folded for storage or transportation. The sanitary wrapping can also take the form of sturdy resilient split plastic tubes which can be dispensed from a dispenser provided near the storage place on the premises of a store for shopping carts. The customer can withdraw the protectors one at a time from such dispenser. Recycling of such resilient plastic covers may be had. The sanitary wrapping may also incorporate an inner or outer removable and disposable secondary shield layer.

18 Claims, 7 Drawing Sheets

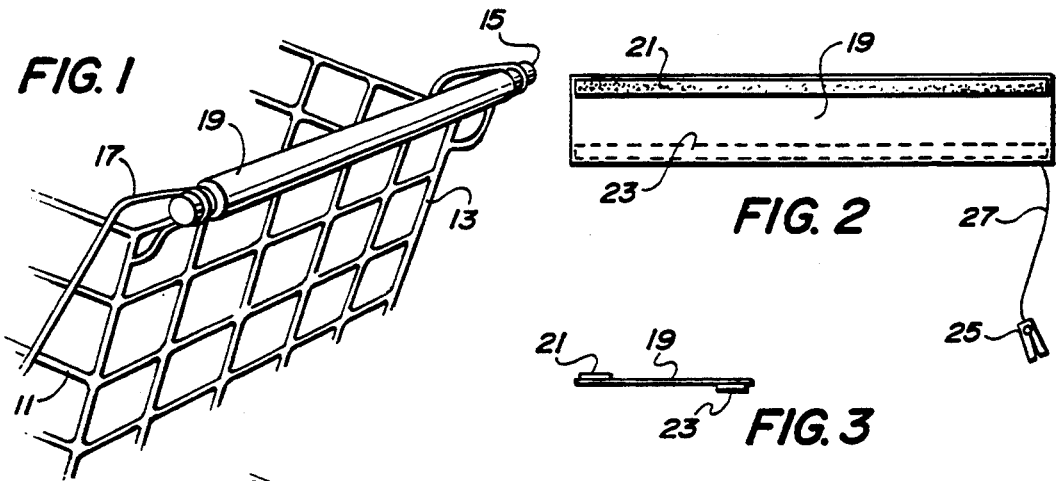
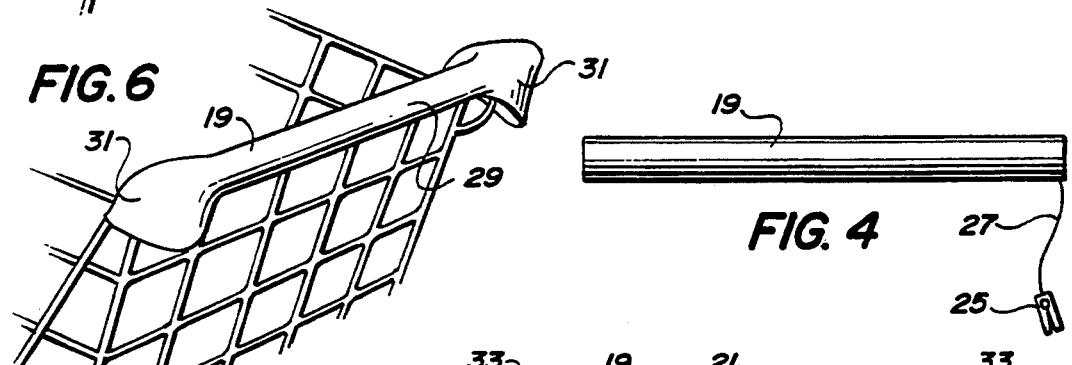
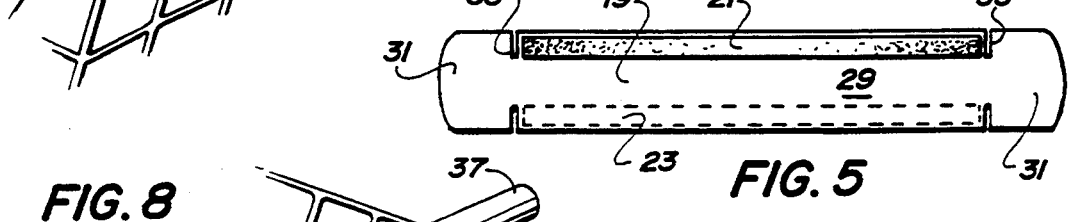
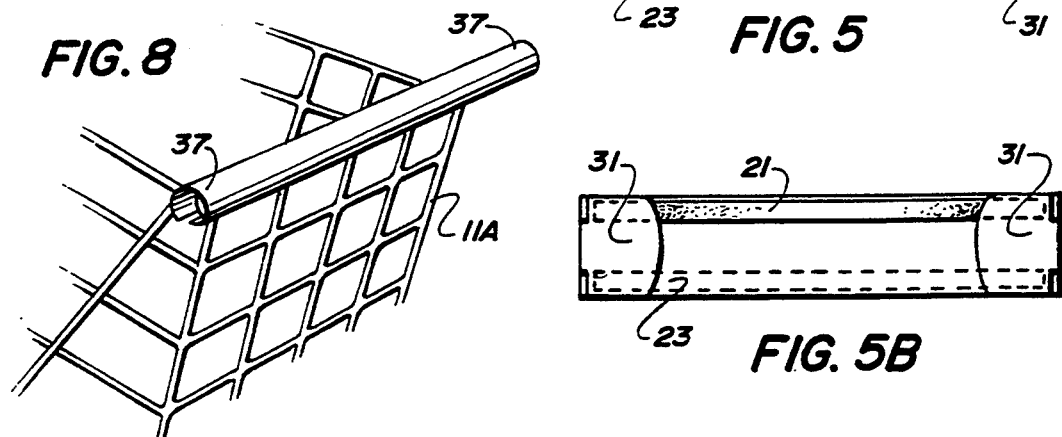
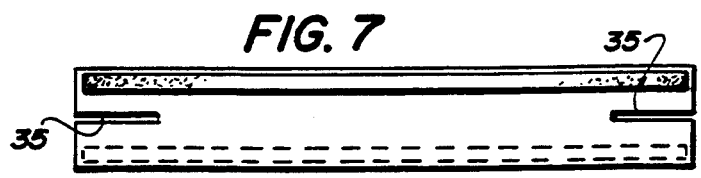

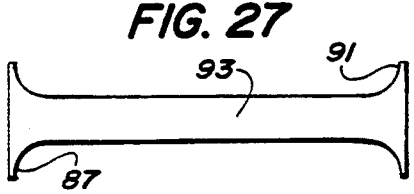
FIG. 22
FIG. 24
FIG. 23
FIG. 25
FIG. 27
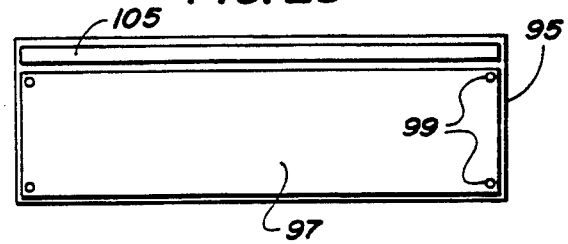
FIG. 26
FIG. 31
FIG. 32
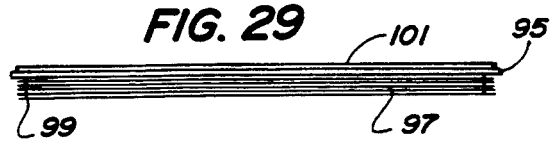
FIG. 28
FIG. 29
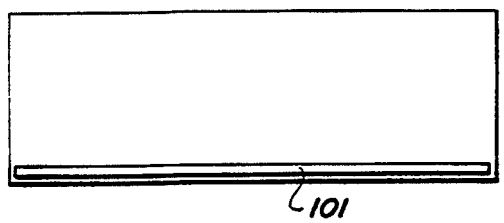
FIG. 30
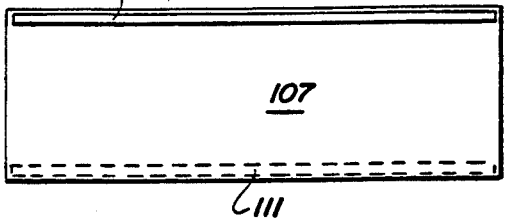
FIG. 33

FIG. 38
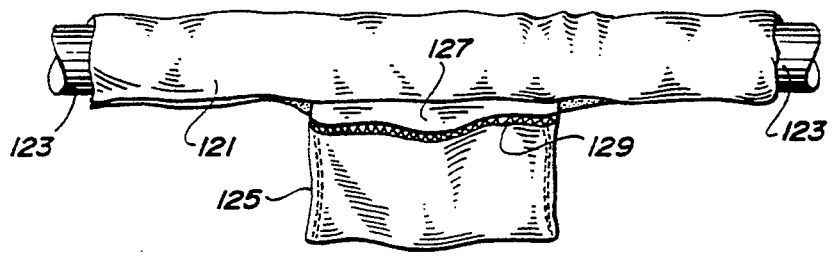
FIG. 39
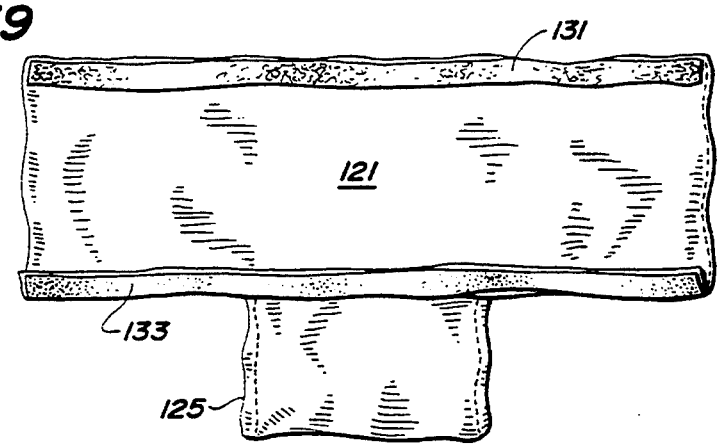
FIG. 40
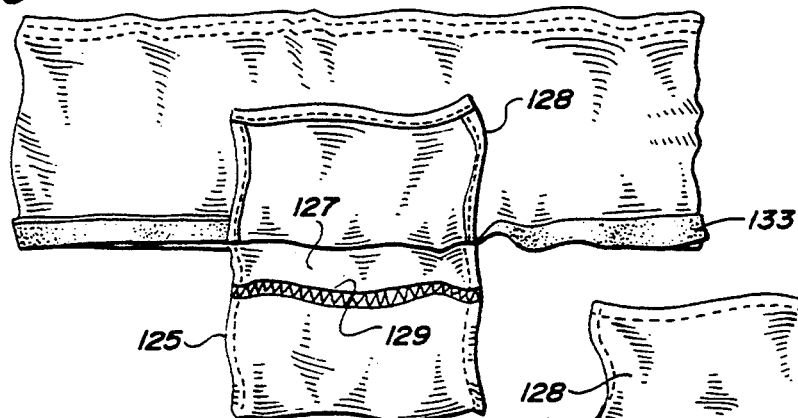
FIG. 41
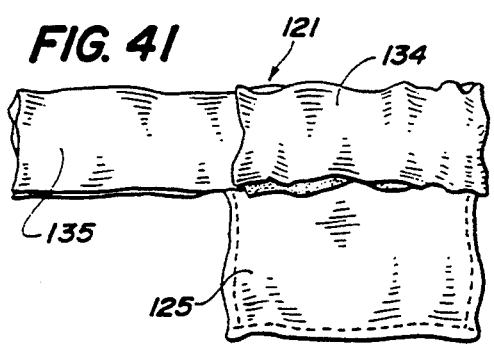
FIG. 42
FIG. 43
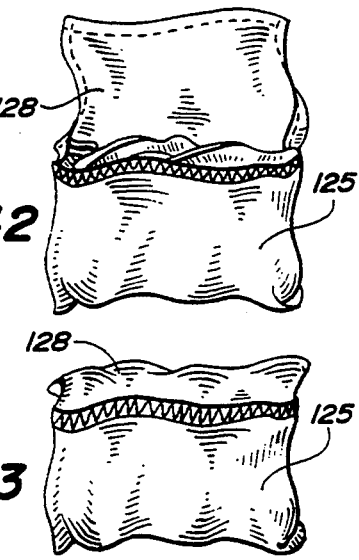

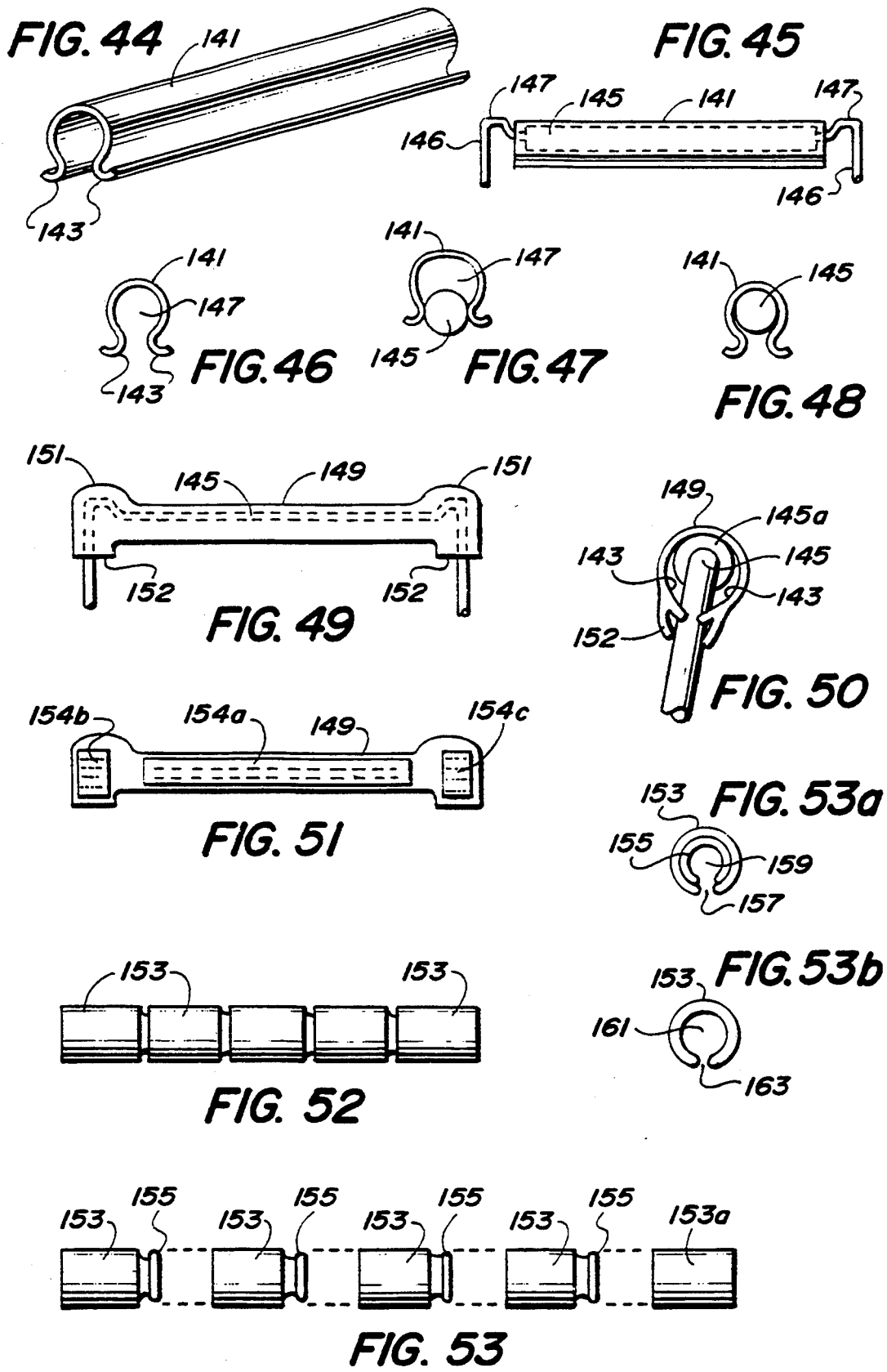

SANITARY PROTECTIVE COVERS FOR SHOPPING CART USE

RELATED APPLICATIONS

This application is a continuation-in-part of U.S. application Ser. No. 08/047,689 filed Apr. 15, 1993 pending by the same inventor and entitled "Sanitary Protective Cover for Shopping Cart Use".

BACKGROUND OF THE INVENTION

1. Field of the Invention

This invention relates generally to sanitary coverings, and more particularly, to sanitary coverings for shopping carts and the like and particularly the handles of shopping carts to prevent the passage of infectious agents from one shopping cart handler or user to another as well as to relieve anxiety in the users of shopping carts in public places concerning contamination from previous users.

2. Description of the Prior Art

It is well known that many disease agents are passed or vectored from one already infected individual to other individuals through direct body contact or through indirect body contact with objects which have come into body contact with an already infected individual or an individual who has failed to take elementary sanitary precautions. For example, it is well known that many individuals are careless about washing their hands after their toilet and that such individuals may frequently carry disease organisms to other persons.

Disease organisms are frequently, for example, carried from one individual to another in the preparation and serving of food. Other disease organisms may be transferred to originally uninfected individuals from infected individuals through the touching of doorknobs, money and the like. In fact, as is generally known, paper money is sometimes provided with bactericidal preparations in order to inhibit passage of infectious organisms. Various bactericidal sprays are available to spray onto surfaces that might become contaminated by bodily contact and become a vector for infection of subsequent persons coming into contact with such surfaces.

One place where disease and infectious processes may be readily passed from one individual to another is the ordinary handle of a shopping cart. As is well known, almost everyone eventually ends up in food stores with their hands grasping the handles of shopping carts. Such handles are almost never cleaned and are handled in some cases, by scores of people during the normal business day. Many of these people are less careful of their personal hygiene than might be desirable and even fastidiously clean individuals may unwittingly transfer disease organisms to other individuals. For example, it is now known that a prime transmittal mode or medium for the cold virus is not so much through small aerosol particles contaminated with disease organisms floating or suspended in the air, but through physical contact from one individual to another, usually via objects which are handled first by the diseased person and later by a healthy person. It is frequently recommended, therefore, that when one is around a person who may be infected with one of the numerous cold viruses or other respiratory diseases, that the healthy person not touch anything which might be contaminated with such virus or viruses and particularly, should not touch their own nose or eyes with anything which may contact with a surface where the cold virus may have collected such as doorknobs, handles of bathroom fixtures, kitchen and other utensils and the like. While the cold virus usually does not remain infectious outside the human body more than several hours, since it is inactivated by drying or desiccation, many similar viruses will remain active outside the body for perhaps four to five or even six hours in fairly moist conditions, and less than four hours under dry conditions. However, several hours is usually a sufficient amount of time for a virus to be transferred from one individual to another. There are also, of course, numerous bacterial disease organisms which may be similarly transferred by direct or indirect contact and may be infectiously viable for considerably longer periods. For example, many types of staphylococci and streptococci bacteria are quite resistant to drying and thus remain infectious for long periods of time. Staphylococcus aureus has achieved considerable notoriety indeed as a so-called nosocomial, or hospital, infectant, i.e. one which is frequently spread in hospitals, but can be readily spread in other environments on various objects coming in contact with susceptible individuals.

One prime source of infectious contact is generally completely ignored by most persons. This is the handle of the ubiquitous shopping cart found in almost all food stores and supermarkets as well as many other stores such as discount drug stores and the like. The handles of these shopping carts are intimately grasped by many individuals during a day, both those who are healthy and those who are sick, those who may be careful in washing their own hands and those who may never wash their hands. While some members of the public recognize this danger and are loathe to touch the handles of shopping carts, there has until now been little which the average individual could do to avoid contact or contamination from this source, other than to carry a tissue or the like and wipe or polish the handle before using it themselves. Such measures, however, while probably helpful, are by no means an effective solution for a rather serious problem. Without soap and water and/or heat, for example, it is not only very difficult to clean the surfaces of most physical objects, but it is embarrassing for many individuals to have others see them trying to take health precautions when it may be implied from their actions by other persons that their friends and neighbors may find them unsanitary or even disease-ridden. Such ostentatious cleaning might also be thought to project a negative image of the business establishment involved.

Most people, therefore, are unaware of the serious problem with respect to transfer of disease organisms and filth in general from one person to another on the handles of shopping carts and the like and those persons who may be aware of such problem, generally, feel it is necessary to "grin and bear it". While there has been some recognition by certain mothers that it may be detrimental for their children to chew, or "teeth," upon shopping cart handles and some partial covers for preventing such teething or mouthing directly upon the handles have been devised, none, so far as the present Applicant is aware, have been suitable for protecting both children and adults.

While there have in the past, also been advertising coverings for shopping cart handles in the form of paper or plastic coverings which advertise sales and the like in the store in which the cart is used, such advertising coverings have, because of their texture and because they are not changed from one customer to another, increased rather than decreased the problem of preventing transfer of infectious material from one individual to another handling or touching the shopping cart handles, since such advertising coverings have been inherently more likely to retain disease organisms even than the bare handle. It has also been suggested to provide other types of coverings for the handles of shopping carts, for example, in U.S. Pat. No. 4,868,544, a shopping cart handle is provided with a wraparound cover into which is incorporated a radio receiver and/or transmitter which aids in location and tracking of the shopping cart. Again, while such coverings in effect isolate the shopping cart handle itself from contact with diseased or infectious individuals, since such coverings permanently cover the handles of shopping carts, they do little, if anything, to prevent the transfer of infectious materials from one individual to another who may handle the shopping cart handles and, in fact, probably increase such transfer because of their formation from materials having a rougher texture than the usual original shopping cart handle. Such handles are, therefore, more likely to retain infectious agents for longer periods in a viable state for transference of disease processes from one individual to another.

There has been a need, therefore, for a means to prevent transfer of infectious agents from one individual to another by way of the common shopping cart handle.

OBJECTS OF THE INVENTION

It is an object of the present invention, therefore, to provide a temporary sanitary covering for a shopping cart handle to prevent infection of a person using the shopping cart derived from a previous individual who may previously have handled the shopping cart.

It is a further object of the present invention to provide a sanitary covering for a shopping cart handle which may be carried by an individual as a personal sanitary device for use while in stores.

It is a still further object of the invention to provide a sanitary wrapping for covering the handle of a shopping cart which is easy to apply and remove.

It is a still further object of the invention to provide a portable sanitary covering for the handles of shopping carts which is both easy to apply and remove and can be carried handily in a purse or the like from store to store.

It is a still further object of the invention to provide a portable sanitary covering for handles of shopping carts which is easy to apply and can be conveniently folded into its own contamination-resistant package for carrying in a pocketbook or pocket.

It is a still further object of the invention to provide a temporary disposable sanitary covering for the handles of shopping carts which can be dispensed at the entrance to a store to those patrons desiring to make use of such covering to protect them from possible contamination from prior customers.

It is a still further object of the invention to provide a convenient sanitary covering for shopping cart handles which extends also over the adjacent portion of the cart or the support for the handle, particularly to prevent young children from grasping the portions of the shopping or touching their mouths to such portions.

It is a still further object of the invention to provide a sanitary covering for the handle of a shopping cart which effectively covers the handle of a full-sized shopping cart, but which can also be used on mini-sized carts.

It is a still further object of the invention to provide a covering for the handle of a shopping cart which will quickly and easily attach to such handle and will protect the hands of the user from any possible contamination by touching uncovered portions of those portions of the shopping cart which may be touched by prior customers.

It is a still further object of the invention to provide a sanitary covering for the handle of a shopping cart which is provided as a series of disengageable coverings which may be torn off by the customer and placed over the cart handle.

It is a still further object of the invention to provide a sanitary covering for a shopping cart which may have other useful attachments to it such as a clip for coupons and the like.

It is a still further object of the invention to provide a sanitary cover for the handle of a shopping cart which is provided with storage compartments for coupons and the like.

It is a still further object of the invention to provide a sanitary covering for a shopping cart handle which is provided broadly with attachment means for the attachment of various desired appendages to such covering.

It is a still further object of the invention to provide a sanitary covering for a shopping cart handle which may be dispensed from a roll of such coverings.

It is a still further object of the invention to provide a sanitary covering for a shopping cart handle which has a renewable sanitary surface for contacting the shopping cart handle.

It is a still further object of the invention to provide a sanitary covering for a shopping cart handle which is both strong and durable and completely non-toxic to eliminate any possibility of toxic reactions by children who may fondle or place their mouths over such sanitary handle covering.

It is a still further object of the invention to provide a sanitary covering for a shopping cart handle which may be conveniently recycled or disinfected and reused by the same or other customers of a commercial establishment.

Other objects and advantages of the invention will become evident by a careful study of the following description of several embodiments together with the appended drawings of various embodiments of the invention.

BRIEF DESCRIPTION OF THE INVENTION

This invention is directed to the protection of the users of shopping carts from possible contamination with disease-inducing organisms or merely undesirable filth possibly left by prior users of the shopping cart. As such, the invention comprises a sanitary covering which may be wrapped around the handle of the shopping cart and quickly and easily secured to protect the customer from direct contact with such handle. The preferred arrangement is to have the sanitary covering provided with a Velcro-type attachment along opposite edges to maintain the sanitary wrapping closed. A preferable embodiment may be foldable into its own carrying pouch. Such arrangement may be used as a personal, portable sanitary covering which a customer will carry with him or her.

In another embodiment, a thin paper or plastic covering may be provided with adhesive-type means to secure the edges of the sanitary covering together about the handle. Alternatively, and very desirably, the covering may be formed from a substantial plastic member which may clip or otherwise lock over a shopping cart handle, will not be damageable by a teething or mouthing child and may be recycled and/or disinfected between uses. In the latter types of arrangements, the sanitary coverings may be dispensed from a dispenser which the customer may either carry with him or which may be provided near a shopping cart storage area by the store itself. Various appendages may be attached to the sanitary handle covering to allow the use of other attachments such as coupon holders, calculators and the like which may at the same time be held or secured to the shopping cart via the sanitary covering for the convenience of the customer or user. The central sanitary handle cover portion of the invention may also have appendages at either end which are provided with a flap-type shield or other extension or the like to cover adjacent portions of the shopping cart to prevent accidental contact with such portions. Means near the end of the sanitary covering may also be provided to prevent the customer from accidently moving their hand beyond the protected portion of the handle and to, therefore, make the customer feel more secure and comfortable. A renewable handle wrapping surface may also be provided within the sanitary covering. Alternatively, a renewable external covering may be provided on a reusable covering or even on a handle itself or on a replaceable handle to enable the customer him or herself to immediately renew the surface of the shopping cart handle shield or the cart handle itself.

BRIEF DESCRIPTION OF THE DRAWINGS

FIG. 1 shows a portion of a shopping cart with the sanitary covering of the invention applied to the handle.

FIG. 2 is a plan view of the sanitary covering shown in FIG. 1 in an open position with fastening means on one side shown in full, and fastening means on the other side, shown in phantom.

FIG. 3 is a side or end view of the sanitary covering shown in FIG. 2 showing the fastening means applied on opposite sides.

FIG. 4 is a side view of the sanitary covering means of the invention rolled up into tubular form as it is shown in isometric view in FIG. 1.

FIG. 5 is a plan view of an alternative embodiment of the invention in which the sanitary covering has additional end sections made to fold down over the sides of the handle of the shopping cart as well as a portion of the cart structure to protect the user of the cart from accidental contact with other portions of the cart which may provide contamination.

FIG. 5B is a plan view of the embodiment of the invention shown in FIG. 5 partially folded for carrying.

FIG. 6 shows the embodiment of the invention shown in FIG. 5 applied to the handle of a shopping cart.

FIG. 7 is a plan view of a further embodiment of the invention which is adjustable to different sized shopping carts.

FIG. 8 is an isometric view of a portion of the handle of a shopping cart with the embodiment of the invention shown in FIG. 7 secured over the handle and extending to the sides.

FIG. 22 is a side view of a version of an embodiment of the invention having advertising materials upon the surface.

FIG. 23 is a plan view of the advertising-type sanitary covering shown in FIG. 22 opened up so that one is looking at the entire top surface.

FIG. 24 is a view of a sanitary wrapping in accordance with the invention in which the outside of the wrapping comprises a series of discount coupons lightly attached to the underlying wrapping.

FIG. 25 is a side view of the sanitary wrapping shown in FIG. 24 illustrating how the discount coupons may be perforated to enable them to be removed from the underlying covering.

FIG. 26 shows the sanitary wrapping arrangement of FIGS. 24 and 25 opened up and spread out so that one may see the various coupons which can be accommodated on the surface.

FIG. 27 is a side view of a sanitary wrapping in accordance with the invention in which there is a flared section at each side or end which prevents the hands of the user from sliding off the protected section.

FIG. 28 is a bottom or inside view of an embodiment of the invention for carrying by the customer himself or herself in which a series of disposable coverings are detachably secured to the bottom for disposal after use so the customers pocket or purse is not contaminated with the sanitary covering itself after touching shopping cart handles.

FIG. 29 is a side view of the embodiment shown in FIG. 28.

FIG. 30 is a top view of the embodiment of the invention shown in FIG. 28 and 29.

FIG. 31 is an end view of the embodiment of the invention shown in FIGS. 28–30.

FIG. 32 is an end view of the embodiment of the invention shown in FIG. 31 with the sanitary wrapping wrapped about the handle of a shopping cart.

FIG. 33 is a plan or top view of an embodiment of the sanitary wrapping or sanitary shielding of the invention in which the wrapping or shielding may be secured to itself or to the handle via magnetic means.

FIG. 38 is a side view of a preferred embodiment of the invention having a dependent pouch extending from one edge of the sanitary wrapping of the invention secured over shopping cart handle shown broken away.

FIG. 39 is a side view of the preferred embodiment of the invention shown in FIG. 38 with the sanitary wrapping section opened out prior to securing about a shopping cart handle.

FIG. 40 is a side view similar to FIG. 39 showing the opposite side of the sanitary wrapping.

FIG. 41 is a side view similar to FIG. 38, but without the shopping cart handle and with one end of the sanitary wrapping folded over, preparatory to complete folding and insertion of the main body portion of the sanitary wrapping into the pouch.

FIG. 42 is a side view of the preferred embodiment of the invention shown in FIGS. 38, 39 and 40 with the main body portion of the sanitary wrapping folded and inserted into the pouch with the flap remaining out of the pouch.

FIG. 43 is a side view of the preferred embodiment shown in FIG. 42 with the flap tucked into the pouch.

FIG. 44 is an isometric view of an alternative embodiment of the invention wherein the main body portion of the sanitary covering is formed of a sturdy resilient plastic material.

FIG. 45 is a side view of the embodiment of the invention shown in FIG. 44 with the sanitary covering applied to the handle of a typical shopping cart.

FIG. 46 is an end view or cross section of the sanitary wrapping shown in FIGS. 44 and 45 before it is applied to a shopping cart handle.

FIG. 47 is an end or cross sectional view of the embodiment of the invention shown in FIGS. 44, 45 and 46, partially expanded as it is pressed over a shopping cart handle.

FIG. 48 is an end view or cross sectional view of the embodiment of the invention shown in FIGS. 44 through 47 with the plastic sanitary covering snapped completely over the shopping cart handle.

FIG. 49 is a side view, partially in phantom, of an alternative embodiment of the invention shown applied over a shopping cart handle.

FIG. 50 is an end view of the embodiment the invention shown in FIGS. 49 and 50.

FIG. 51 is a side view of a sanitary covering such as shown in FIG. 49 before it is applied to a shopping cart handle showing printed advertising or other material applied to the outside of such sanitary covering.

FIG. 52 is a side view of a still further embodiment of the invention in which the sanitary covering which is formed basically of sturdy resilient plastic material as in FIGS. 44 through 51, is formed of separate articulated sections which may be conveniently disassembled or re-assembled when not in use or re-assembled over a shopping cart handle.

FIG. 53 is a side view of the individual sections of the embodiment of the sanitary covering shown in FIG. 52 disassembled and partially separated from each other.

FIG. 53A is an end view of the male end of one of the separated sections shown in FIG. 53.

FIG. 53B is an end view of the opposite female end of the separate section of sanitary covering shown in FIG. 53A.

DESCRIPTION OF THE PREFERRED EMBODIMENTS

Figure 9:
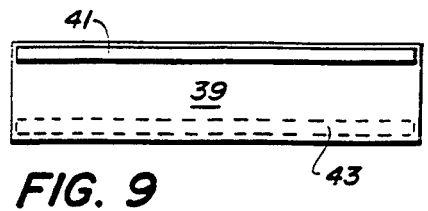
FIG. 9 is an alternative embodiment of the invention in which the sanitary covering is a thin plastic or paper composition and has adhesive sections on the surface for securing around a handle.

The present invention provides a sanitary means for protecting the users of shopping carts in markets, malls, large drug stores and other establishments from possible contamination by infectious agents carried on the handles of such shopping carts. Since shopping carts are intimately handled by many people during each day, there is a great potential for contamination of customer's hands by invisible residues including microbes and other potentially serious infectious agents left from the hands of previous users. As is well know, many disease-inducing and infectious agents including, but not limited to viruses, bacteria, parasites, retroviruses and the like are frequently spread by direct or indirect contact with a physical carrier of such infectious or disease agents. For example, even the common cold and other respiratory diseases are known to be spread not so much by airborne droplets, which are so fine that only a fairly small amount of infectious agent is frequently transferred, but by direct transfer of infectious agents to either the nasal passageways by bringing one's fingers and hands near such passages or by rubbing one's eyes or the like after having contacted surfaces which have recently been contacted by someone with a cold who has or had a significant amount of infectious agent on their own hands. The amount of such infectious agent gained by such direct contact is frequently, as a practical matter, considerably greater for each contact than for a similar contact with airborne droplets carrying the same infectious organisms. Consequently, while the body's defenses may be able to fight off contact with airborne infectious agents, if not too concentrated or infectious, it may be difficult for one's body defenses to fight off direct contact with the same infectious agents.

While most of the public has not up to now been cognizant of the potential for infectious transfer by contact with shopping cart handles and the like, a few particularly aware or careful individuals have always been somewhat loathe to touch such handles, realizing the significant potential for infectious transfer. Such persons have had little alternative, however, other than to wear gloves when touching such surfaces and even this is not an adequate remedy for the difficulty, since gloves themselves then become contaminated and may in turn transfer infectious agents from their surface to either the hands or other body parts of the wearer. The above difficulties have now been effectively obviated by the present invention which provides a sanitary covering for the handles of shopping carts and the like. Such sanitary covering is designed to be secured about the handle and to substantially cover it so as to provide a sanitary surface upon which the user's hands may be placed.

FIG. 1 is an isometric view of the rear portion of a shopping cart 11 made of the usual wire mesh construction 13 with a handle 15 extending outwardly and somewhat upwardly from the top of the cart 11. The handle 15 is supported on handle brackets 17 and has a sanitary wrapping 19 secured about it. Such sanitary wrapping, it will be understood, has been wrapped about the handle by the user of the cart to protect the hands of the user from contamination with the surface of the handle 15 which may have been touched by numerous people within the immediately preceding period of several hours in which case any disease vectors deposited upon the surface of the handle may still be infectious.

FIG. 2 is a plan view of one side and FIG. 3 is an end view of the sanitary wrapping 19 shown wrapped about the handle 15 in FIG. 1. The sanitary wrapping 19 may be formed from a smooth, preferably water-resistant or waterproof material, which may be the material from which some outdoor sport clothes are made and having a small amount of padding within such sanitary wrapping to provide a pleasing padded feeling upon the surface of the cart. Such padded sanitary wrapping 19 is preferably provided at the end of one side with a Velcro-type or brand fastening 21 and at the other side with a comparable Velcro-type fastening 23, as seen particularly in a side or end view in FIG. 3, the two Velcro-type fastenings being arranged and constructed to be brought together when the sanitary wrapping 19 is wrapped about the handle 15 and interlocked with each other to maintain the sanitary wrapping 19 about the handle. It has been found that a Velcro-type fastening, if of reasonable quality, will provide a very secure fastening, or an effective adhesion between the two Velcro pieces, which is more than sufficiently strong to maintain the sanitary wrapping 19 tightly about the handle 15, even when subjected to a fair amount of tension and pressure during wheeling of the shopping cart through a store, and even if such shopping cart should be one of those far-from-rare specimens of its type whose wheels have completely worn out so that a great deal of shoving and pulling must be effected to move the cart through a store or even to move it at all. Any more or less equivalent strength self-adherent fastening or adhesive may be used in place of the Velcro-type fastening, but there are few which are as convenient and effective as Velcro-type fastenings.

FIG. 4 is a side view of the sanitary wrapping 19 secured into a tubular arrangement as though it was wrapped about a handle of a shopping cart as shown in FIG. 1. It will be noted that the sanitary wrapping 19 as shown in FIG. 4 is provided with a clip 25 secured on a thong 27 and adapted to secure store coupons, sales literature and the like to the shopping cart in easy reach of the user via attachment to the sanitary wrapping. It will be noted also, as shown more particularly in FIG. 3, that the Velcro strips 21 and 23, as explained above, are on opposite sides of the sanitary wrapping so that the wrapping can be easily formed into a cylinder secured to itself. This has been found the most convenient arrangement for quickly and easily securing the two sides of the sanitary wrapping together as they lie over the handle 17. However, it will be understood that the Velcro fastening strips could also both be arranged on the same side of the sanitary wrapping in which case when the sanitary wrapping is wrapped upon the handle 15, the one side will be looped under or against the other side so that the Velcro-type fastenings meet. This will also provide a secure inner attachment, but not as secure an attachment as having one of the Velcro strips on one side and one on the other, since the two sides can then be brought into contact in their circumferential path while if the fastening strips are arranged both on the same side of the sanitary covering 19, the two Velcro strips can only be secured to each other by bending the two strips up into a ridge along the edge of the handle. While this has some advantage in securing the sanitary strip about the handle, particularly without touching the internal portion of the strip, it does not provide quite as secure a grip between the two Velcro strips, since a considerable amount of the tension against the strips is distributed straight outwardly rather than parallel to the strip. Having both of the Velcro strips on the same side of the sanitary wrapping 19 also does not provide as smooth a wrapping about the handle and may not be as comfortable to the user, particularly if the ridge along the sanitary wrapping becomes displaced upwardly against the user's hands.

Since the sanitary wrapping of the invention is provided not only to protect the hands of a customer from contamination with disease organisms derived from previous customers who may have touched the handle or other portions of the shopping cart, but to the mouth of the customers' children from the handle, if such children should mouth or chew on the handle or wrapping, not an uncommon occurrence, it has been found highly desirable, if not critical, to form at least the exterior of the sanitary wrapping of the invention from a so-called "child-proof" material of which there are several approved by testing laboratories and governmental agencies. A preferred material is No. 6200 Oxford polyamide plastic material with a ¾ ounce polyurethane coating. The base of this material is formed from a Dupont 6.6 nylon with ¾ ounce per square unit polyurethane coating and meets Fisher-Price Standard Specifications for material for toys. It can currently be purchased from the Rockville Fabric Corporation of 22 West 34th Street, New York, N.Y. 10001. This material is practically indestructible with respect to abuse by children and is smooth and non-porous, thus not easily contaminated and completely non-toxic to children, or for that matter, adults.

FIG. 5 shows an improved embodiment of the sanitary wrapping of the invention in which the main portion 29 of the sanitary wrapping 19 is provided on the ends with two cowls or flaps 31 attached to the end of the portion of the sanitary wrapping which is to be formed into a tubular shape and arranged so that when the sanitary wrapping 19 is coiled about the handle 15, the cowls or flaps 31, when properly disposed in place, extend over, fall down or depend downwardly over the side portions of the handle of the shopping cart 11 shielding the hands of the user of the cart from such portions also. The embodiment of the invention shown in FIG. 5 is shown in FIG. 6 placed over the handle of a shopping cart with the cowls 31 extending over the ends of the handle as well as the ends of the shopping cart. The cowls or flaps 31 are preferably not padded, so that they fall or cascade easily down the sides of the cart and readily adapt themselves to the shape of the ends of the handles on the sides of the cart to provide better protection. No padding is required in the cowls or flaps, since the hands of the user do not normally contact this portion and since there is no need for padding to make a more pleasing surface or feel on the handle portion. Omission of padding from the flaps 31 also allows such flaps to be easily wrapped around the exterior of the sanitary wrapping or alternatively, folded inside the sanitary wrapping when it is being carried. Folding the flaps into the interior of the sanitary wrapping with their cart contacting surfaces against the inside of the wrapping, or against the handle contacting surfaces of the wrapping, as shown in FIG. 5B, also prevents contamination of the outside surface of either the sanitary wrapping or the end cowls by contact with each other. Such folding in of the cowls or flaps may, if the Velcro fastenings run the length of the principal portion of the sanitary wrapping 19 or the main section 29 of such wrapping, contact the surface of such Velcro strips towards the ends, preventing them from contacting each other when the sanitary wrapping 19 is formed into a tubular section such as shown in FIG. 4 for storage or the like. However, such folding, which, in effect, partially shields the Velcro section with the flaps 31 during storage has no detrimental effect since the entire Velcro strip is not required to hold the section in a tubular storage form or section when not in use, no substantial forces being upon such section during storage. It will be noted in FIG. 5 particularly, that the entire protective sanitary wrapping 19 in the embodiment shown, may be formed from a single piece of material which has a tubular section in the center and in which the end flaps 31 are attached only at their centers to the tubular portion of the wrapping. As shown in FIG. 5, the separation between the end cowls or flaps 31 and the central section 29 may include essentially grooves, notches, or channels 33 which separate the main portion 29 of the sanitary wrapping from the cowl or flaps 31 and facilitates bending and draping of the end cowls or flaps down the side of the handle.

FIG. 7 shows a plan view of an alternative embodiment of the sanitary wrapping of the invention in which a longitudinal groove, notch or channel 35 at each end provides a portion or separation where a handle bracket 17 of a shopping cart handle may extend if the sanitary wrapping 19 in its tubular form is too wide or long for the particular handle with which it is being used. This allows the embodiment of the invention shown in FIG. 7 to be adapted for use not only with the normal size, fairly wide shopping cart such as is usually found in large markets and malls, but also to the smaller or miniature-type shopping cart which is found more frequently in some mass market drug stores, fast service vending stores, such as the so-called convenience stores, for example, 7-11 Stores and Wawa Stores, and other vending establishments where the customers may not be expected normally to buy a great deal, but instead to purchase a small amount quickly and conveniently at a somewhat higher price. The groove 35, when the sanitary wrapping 19 is used on a smaller cart allows the end of the wrapping to extend outwardly over the ends of the handle still basically maintaining the tubular configuration of the sanitary wrapping. The extension of the ends of the wrapping possibly somewhat from the sides of the cart does no harm, since the wrapping is flexible and will not damage anything which it touches. The extension of the ends 37 of the sanitary wrapping over the ends of the handle 15, not shown, is illustrated in FIG. 8 in which a narrower cart 11A such as used frequently in large drug stores and convenience stores is shown. In FIG. 8, the protective wrapping extends only to the ends of the handle and not beyond, but it will be recognized that depending upon the relative width of the shopping cart and the sanitary wrapping, such wrapping might extend beyond the ends of the handle.

Figure 10:
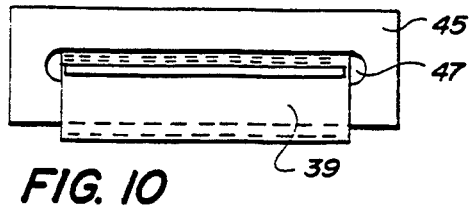
FIG. 10 is a front view of a dispenser for disposable sanitary coverings such as shown in FIG. 9 with one of the coverings extending from a dispensing opening in such dispenser.

FIG. 9 shows a plan view of a disposable-type sanitary wrapping 39 having an adhesive material 41 along one edge on one side and preferably a somewhat roughened area 43 on the opposite side along the opposite edge of the wrapping 39 which when the two edges of the wrapping are brought together, allows the adhesive material 41 to adhere strongly to the roughened area. It should be understood, however, that although a roughened area 43 is preferred and shown, in a simpler embodiment, only the adhesive area 41 need be used, provided the entire sheet is made from a material to which the adhesive 41 will adhere. Alternatively, both the areas 41 and 43 could constitute adhesive areas. Preferably, the disposable sanitary wrapping 39 may be arranged with other similar wrappings to be dispensed from a container 45 such as shown in FIG. 10 where a box having an elongated orifice or dispensing opening 47 is shown with one of the disposable sanitary wrappings 39 extending therefrom. It will be recognized that the arrangement is somewhat like a Kleenex tissue dispenser. However, since the disposable sanitary wrapping 39 is provided with an adhesive on one side to facilitate its attachment via one side to the other about a shopping cart handle, it is preferable that the various disposable sanitary wrappings which may be contained in the box 45 be temporarily adhered one to the other and folded up into alternating sheets which may be pulled one at a time from the dispenser and detached by applying pressure to one corner, whereby the whole sheet may be progressively detached from the next sheet. Alternatively, the adhered sheets may be dispensed from a roll of adhered sheets with or without a dispensing box 45.

Figure 11:
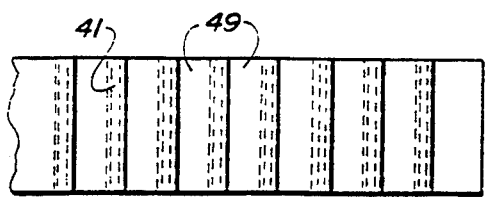
FIG. 11 is a plan view of a series of the disposable strips as shown in FIG. 9 temporarily secured to each other to allow them to be drawn one by one from the dispenser 10.
Figure 12:
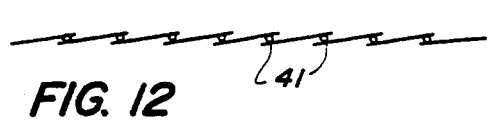
FIG. 12 is a side view of the strip of materials shown in FIG. 11 showing how the strips are overlapped.

FIGS. 11 and 12 show respectively a bottom view and a side view of a series of the sanitary wrappings shown in FIG. 9 adhered to each other. The sanitary wrappings 39 shown in FIGS. 11 and 12, however, do not include the roughened area 43, since it is assumed that the adhesive 41 is sufficiently adherent to the plain surface of the sheet to hold the sheets together until they have sufficient sidewise shearing strain applied to them to progressively break the adhesion of the glue strip and remove the outer most accessible sanitary wrapping from the underlying sanitary wrappings. The inter-adhered collection of sanitary wrappings forms a composite strip 49 of such connected wrappings, the glue strips 41 being shown in phantom in FIG. 11, since with the disposable sanitary wrappings attached to each other, the glue always appears as shown in FIG. 12 between the two sheets. It will be understood that the individual sheets 39 will be withdrawn from a dispenser such as the box 45 in a manner such that the edges of the sheets are exposed to as little likelihood of snagging on the edge of the opening 47 as possible. It will be understood also that when the individual sanitary wrapping has been detached from the adjacent wrappings, it may then be easily wrapped about a shopping cart handle such as shown in FIGS. 1, 6 or 8.

Figure 12A:
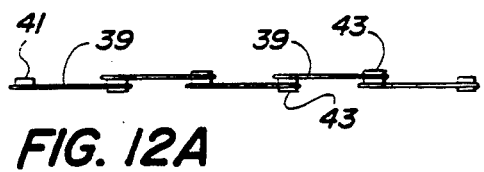
FIG. 12A is a side view of an alternative arrangement for securing the individual sheets together in overlapped fashion with less adhesions between adjoining sheets in the dispensing container than between the two sides of the same sheet in actual use.

FIG. 12A shows a side or edge view of an alternative arrangement for connecting the individual sheets together for dispensing in which the individual sheets each have the roughened or other surface 43 on the side near the edge opposite the side on which the adhesive is deposited as shown in FIG. 9. Such sheets are then arranged in a composite strip as shown in FIG. 12A with the adhesive sides alternating upwardly and downwardly so that the adhesive of each sheet is secured to a smooth section of the adjacent sheet for ready breaking of such adhesion between sheets in removing the sanitary wrapping sheets from a box. However, in wrapping such sheets about the handle of a shopping cart, the adhesive end of the sheet is then secured about the handle with the adhesive opposed to the roughened portion of such sheet to provide better adhesion between the two sides during actual use. It will be understood that other arrangements are also possible.

Figure 13:
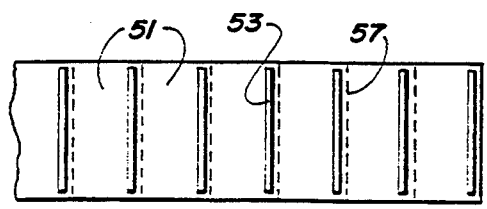
FIG. 13 is a bottom plan view of an alternative arrangement of the invention in which the sanitary wrapping of the invention is provided in a strip which has been perforated so that individual wrappings may be torn off and used as a wrapping about the handle of a shopping cart.

FIG. 13 is a plan view of an alternative form of connected strips of disposable sanitary wrappings 51 in which the individual wrappings 51 are attached to adjacent wrappings by a perforated arrangement similar to a roll of stamps or the like. In order to prevent the adhesive material 53 from adhering to parts of the dispenser or other sheets which it is not wished for it to adhere to, there is provided in the embodiment of the invention shown in FIGS. 13 and 14, and shown more clearly in FIG. 14, a backing or tear strip 55. Such backing strip may be seen in FIG. 14 which is a side view of the connected strip of alternative disposable sanitary wrappings. The perforations 57 are in each case adjacent to an adjoining adhesive strip or section.

Figure 16:
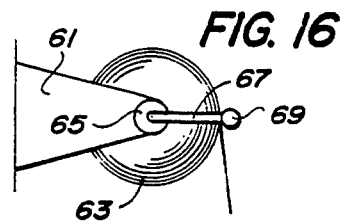
FIG. 16 is a side view of a roll arrangement for dispensing of the sanitary coverings shown in FIGS. 13, 14 and 15.
Figure 14:
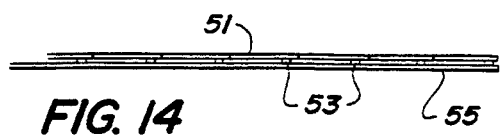
FIG. 14 is a side view of the embodiment of the invention shown in FIG. 13 showing a tear strip upon the surface to protect adhesive portions which are used only on one side of the sheet.
Figure 15:
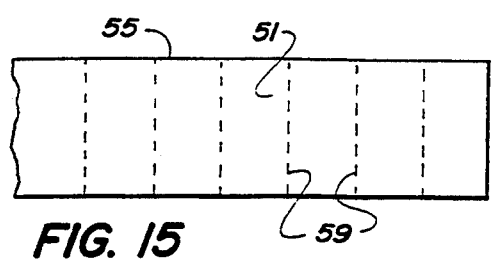
FIG. 15 is a top plan view of the sanitary wrapping shown in FIGS. 13 and 14.

FIG. 15 is a bottom view of the tear strip 55 adhered lightly to the bottom of the disposable sanitary wrappings 51. It will be noted that the tear strip 55 is also provided with perforations 59 similar to the perforations 57 separating the individual sheets of the disposable sanitary wrapping 51 from each other. It will also be noted that the perforations 59 in the tear strip and the perforations 57 in the strip of disposable sanitary wrappings 51 are opposite or adjacent to each other so that one of the sanitary wrappings may be easily torn from the strip of sanitary wrappings, the backing strip removed, and the individual sanitary wrapping 51 wrapped about the handle of a shopping cart with the two edges adhered by means of the adhesive layer 53 between the two, such adhesive layer as shown in FIG. 13 being found on only one side and at one end of the one perforated strip of sanitary disposable wrappings. The embodiment of the invention shown in FIGS. 13, 14 and 15 is particularly convenient for dispensing from a roll of a continuous collection of individual disposable sanitary wrappings. Such a roll is shown in FIG. 16, in side view. In FIG. 16 a bracket 61 is affixed to a horizontal surface, not shown. A roll of a series of disposable sanitary wrappings 51, as shown in FIG. 13 through 15, are rotatably journaled as shown in FIG. 16, upon a small roller 65 provided in the bracket 61. The composite strip 63 on the roll 65 will be understood to be the composite strip illustrated in FIGS. 13, 14 and 15. Other suitable strips of severable or otherwise detachable individual sanitary wrappings may be used. While a full tear strip 55 as shown is preferable, it will be evident that short individual tear strips could be used only over the adhesive sections or deposits on the face of the sanitary wrappings. The small roll 65 is freely rotatable in the bracket 61. An elongated bracket 67 preferable supports a small guide roll 69 under which the composite strip 63 may be fed and individual perforated sanitary disposable sanitary wrappings 51 detached therefrom by tearing along the edge of the guide roll 69.

Figure 17:
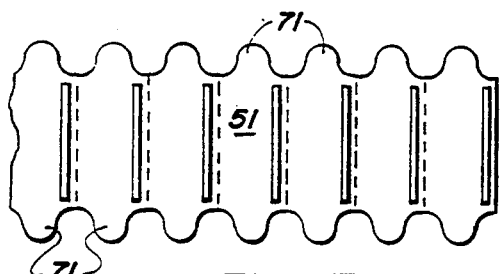
FIG. 17 is a plan view of an alternative arrangement of the invention similar to that shown in FIGS. 13, 14 and 15, but in which the sides of the disposable sanitary coverings for the shopping cart handle are scalloped to provide protective flaps. The extensions on both sides provide flap covering for the sides of the shopping cart such as shown in FIG. 5 and 6.

FIG. 17 shows an alternative version of the invention similar to the perforated tear strip arrangement shown in FIGS. 13, 14 and 15, but in which each of the individual alternative disposable sanitary wrappings 51 is provided with two flaps 71, which, when the individual alternative disposable sanitary wrappings are rolled around the shopping cart handle, may depend from the sides of the rolled sanitary disposable wrapping covering outboard portions of the shopping cart and the shopping cart handles to prevent accidental contact of the fingers of the customer with such sections of the cart. The erected or in-use version of the invention, therefore, is substantially similar to that shown in FIG. 6 except that the disposable sanitary wrappings shown in FIGS. 5, 5B and 6 are formed from heavier material and are reusable. It will be understood that the individual disposable sanitary wrappers will be detached from the line of sanitary wrappers along the detachment perforations as before.

Figure 18:
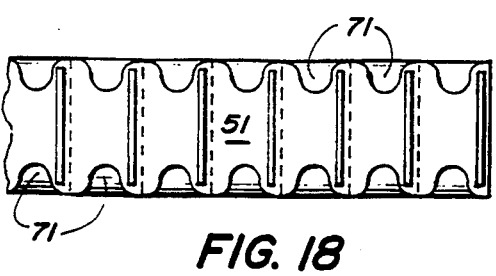
FIG. 18 shows a further embodiment of the sanitary covering of the invention in which the flaps on the sides are overlapped with the strip itself for ease of dispensing and which open up after the sanitary covering is wrapped about the handle.

FIG. 18 shows a similar arrangement to that shown in FIG. 17 in which the flaps 71 have been folded inwardly to lie against the back of the connected strip of sanitary wrappings. This is convenient for dispensing of the individual sections from a roll or other dispenser after which the flaps 71 may be straightened out so that when a single, sanitary wrapping 51 is detached and wrapped about a shopping cart handle as shown in FIG. 6, the flaps 71 will depend from the ends of the sanitary disposable wrapper as shown in FIG. 6 with respect to flaps 31.

Figure 19:
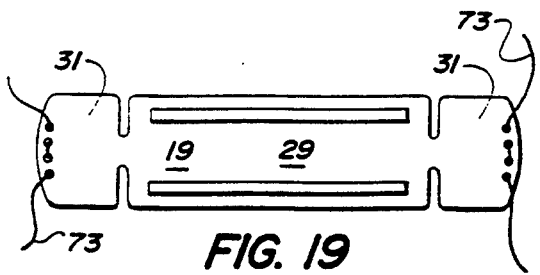
FIG. 19 is a plan view of an alternative embodiment of the invention similar to that shown in FIGS. 5 and 6 in which there is provided a further tying means for securing the flaps on the sides of the sanitary covering down against the shopping cart structure.

FIG. 19 is a plan view of an alternative arrangement similar to that shown in FIG. 5 except that there are tie thongs 73 provided in the end of the flaps 31 so that such flaps can be tied down on the structure of the shopping cart as shown, for example, in FIG. 6 where no tie is used, but where it can be readily visualized how the flaps 31 would be drawn down if the tie 73 was available to tie the ends of the flaps directly to the sides of the shopping cart.

Figure 20:
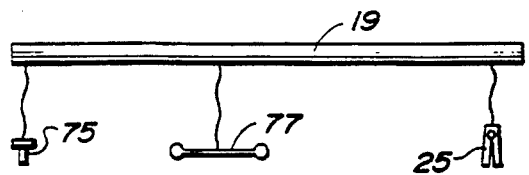
FIG. 20 is a side view of an embodiment of the invention, particularly for use by young children, in which various amusements are provided on tethers from the side of the sanitary covering.

FIG. 20 shows an individual sanitary wrapping such as shown in FIG. 4 additionally provided with baby toys and the like, including a pacifier 75 and a rattle or the like 77, or a clip 25 as in FIG. 4, are provided upon the sanitary wrapping 19.

Figure 21:
FIG. 21 is a side view of the embodiment of the sanitary covering of the invention having a small calculator attached to the side for use by a customer in stores.

FIG. 21 shows an embodiment of the invention in which a sanitary wrapper 19, shown in rolled storage form, is provided with a small calculator 79 for making calculation of purchases, prices and the like.

FIG. 22 shows a sanitary wrapper 51 such as shown in FIGS. 11 and 12 or more preferably 13, 14 or 15, having advertising material upon the surface. It will be understood that the sanitary wrapping dispensed from a roll or the like on the premises of a store for attachment to the handle of a shopping cart may be provided as shown with advertising material printed on the surface for which the store or alternatively the supplier of the sanitary wrapping dispensers would be entitled to a fee in the nature of an advertising fee.

FIG. 23 is a plan view of the outer surfaces of the individual sanitary wrapping shown in FIG. 22 opened up to where it can be seen that there is other advertising material on the surface.

FIG. 24 shows a variation of the invention in which the surface of the sanitary wrapping comprises a series of store-type coupons which may be perforated between them for removal and use of the coupon.

FIG. 25 is a side view of the sanitary wrapping shown in FIG. 24. As may be seen in FIG. 25, individual portions 81 of top sheets 83 secured by adhesive layers 85 to a bottom sheet 87 are removable from such bottom sheet 87 to form individual coupons useful for reductions or discounts on merchandise. The lower sheet 87 is in turn provided with adhesive layers 89 which secure the lower sheet 87 to the handle of a shopping cart. The sanitary wrapping shown in FIGS. 24, 25 and 26, therefore, is a composite wrapping having a lower section 87 which serves as the actual sanitary wrapping and an upper layer 83 which may be separated into individual coupons 81. The upper layer 81, therefore, may be individually and separately detached from the lower layer for immediate use of the individual coupons 83 which may also be detached from each other. The lower layer 87, which serves as the actual sanitary layer, is provided with a glue strip 89 which serves to unite the two ends of the strip when it is wrapped about a shopping cart handle. When convenient, the individual coupons 81 can then be detached from the lower sanitary wrapping 87 by breaking the perforations about the coupon which is desired to be redeemed and then lifting the coupon up whereby the temporary adhesive which normally holds the coupons 81 to the lower sanitary wrapping 87 will part and the coupon can be used. The glue between the coupons and the sanitary wrapping is, as indicated above, merely a temporary glue which only serves to keep the coupons wrapped about the individual sanitary wrapping until it is desired to redeem them. Such adhesive should be of a type which after the coupons are removed is no longer sticky so that neither the customer's hands nor the back surfaces of the tickets become fouled.

In FIG. 27, there is shown a form of sanitary wrapping such as shown in FIGS. 1, 4, 6, 20 or 21 in which the end 91 of the wrapping 93 is built up to provide a guard to prevent the hand of the user from passing or moving accidentally beyond the end of the sanitary wrapping. The upturned ends 91 of the guard can be formed or shaped by various constructions, including the use of extra padding at the ends, molded ends, inflatable ends and the like.

FIG. 28 is a bottom view a particularly desirable portable embodiment of the invention in which the inside or bottom surface of the sanitary wrapping 95 is provided with its own disposable secondary sanitary covering 97 which, after being used on the handle of a shopping cart, can be removed from such sanitary wrapping and thrown away with whatever contamination such covering 97 may have accumulated from the actual cart handle. As shown in FIG. 29, which is a side view of such sanitary wrapping 95 including a series of layers of the secondary sanitary coverings 97, the individual sheets are lightly tacked or secured to the sanitary wrapping by a series of light tackings using glue impregnations 99 at the corners of the individual sheets as shown in FIG. 28. FIG. 30 is a top view of the sanitary wrapping shown in FIG. 28 and 29 showing an upper adhesive or Velcro strips 101 which, when the sanitary wrapping shown in FIG. 34 from the end is folded or wrapped about a handle 103 as shown in FIG. 32, allows the sanitary secondary coverings 97 comprised of thin paper tissue or the like to be completely wrapped about the handle while the top Velcro strip or adhesive 101 is free to contact the Velcro strip or adhesive strip 105 to hold the sanitary wrapping about the handle 103. When the sanitary wrapping 95 is then removed from the handle 103, the top sheet of sanitary secondary covering sheet 97 can be stripped from the bottom and disposed in any convenient trash receptacle and the sanitary wrapper 95 then placed in a pocket, a purse, shopping bag or the like without fear of contaminating such carrying or storage place.

FIG. 33 is a plan view of a sanitary wrapping according to the present invention in which the sanitary wrapping 107 is provided with magnetic strips 109 and 111 on opposite sides for adherent interaction or attraction with each other to hold the sanitary wrapping about the handle of the shopping cart.

Figure 35:
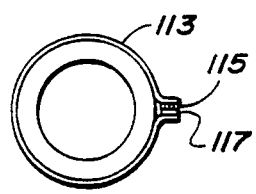
FIG. 35 is an end view of the embodiment shown in FIG. 34.
Figure 34:
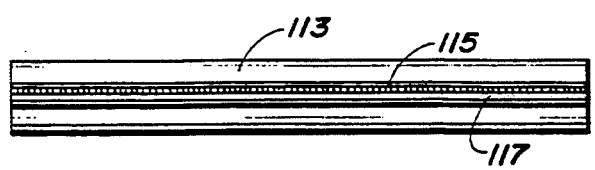
FIG. 34 is a side view of a further embodiment of the invention in which the securing means is on the same side of the sanitary wrapping or covering shown wrapped about a shopping cart handle.
Figure 36:
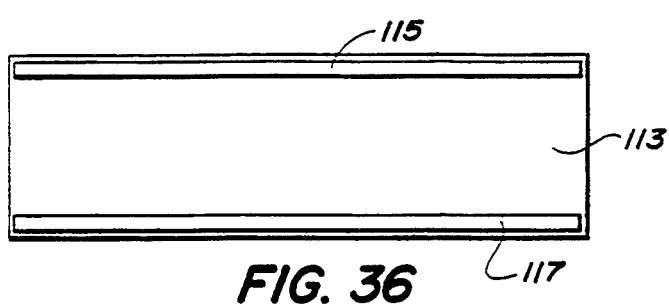
FIG. 36 is a plan or top view of the embodiment of the invention shown in FIGS. 34 and 35 opened out.

FIG. 34 is a side view of an embodiment of the invention in which the adhesive or Velcro fastening of the sanitary wrapping is disposed upon the same side rather than opposite sides of the wrapping and in which 113 is the sanitary wrapping and 115 and 117 are the Velcro or adhesive strips. FIG. 35 is an end view of the sanitary wrapping of FIG. 34 and FIG. 36 is a plan view of the sanitary wrapping of FIGS. 34 and 35 opened up. The arrangement shown has the advantage of being easier to apply to the handle without contacting either the interior of the wrapping or the handle surface, but the disadvantage of not being retained as tightly on the handle and also providing a ridge which may not add to the comfort of one grasping the handle of the shopping cart.

Figure 37:
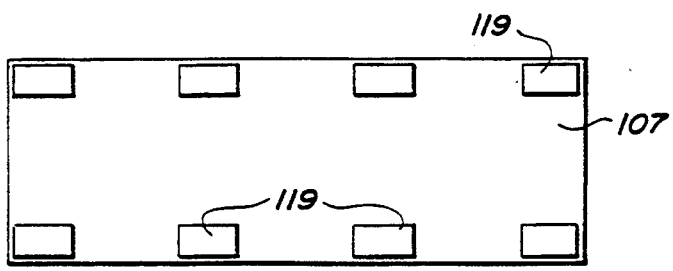
FIG. 37 is a plan view of an embodiment of the invention using magnetic means to secure the sanitary wrapping directly to the handle of a shopping cart itself.

FIG. 37 shows a plan view of an embodiment of the invention such as shown in FIG. 33 where a series of individual magnets 119 are used rather than elongated magnetic strips as shown in FIG. 33 to hold the sanitary wrapping together or about the handle of a shopping cart. Since a magnetic field will pierce non-magnetic or nonmetallic materials, it may be satisfactory to have the magnets 119 or even the magnetic strips 109 and 111 on the same side of the sanitary wrapping 107 or, alternatively, they may be mounted inside of a fabric sanitary wrapping.

In the above disclosure of sanitary wrappings adapted to be dispensed from a dispenser of various forms upon the premises or outside the premises of a commercial establishment, the sanitary wrapping itself will usually comprise either a single sheet of durable sheet material such as paper or plastic sheet having sufficient thickness and durability to offer complete temporary protection from contact with the handle of a shopping cart and a combined flexibility and/or resiliency that will allow it to be easily and conveniently wrapped and secured to the handles once removed from its dispenser or source. While such sheets may be single layer sheets, they may also be composite layer sheets such as composite layer plastic sheets or paper sheets coated with smooth, biologically impervious plastic or other surface coatings. Such sheets on the surfaces should also be at least temporarily child proof, including being non-toxic.

FIG. 38 shows a preferred embodiment of the invention for carrying in the purse or pocket of a user of shopping carts in which a main body portion 121 of the sanitary wrapping is shown wrapped about a short section of shopping cart handle 123, shown cut off at the ends. The main sanitary wrapping portion 121 has attached to one side of such main portion 121 a pouch 125 which essentially comprises an extension from one side of the main body portion 121 folded over and secured together into a pocket 127 having an upper edge 129.

The main body portion 121, as described above, is shown in FIG. 39 opened up in the condition in which it is just before being applied to the handle 123 of the shopping cart. In FIG. 39, the preferred Velcro-type adhering or fastening strips 131 and 133 are shown on both sides or edges of the main body portion 121 of the sanitary wrapping. This has been found to be the preferable arrangement in the embodiment of the invention incorporating the pouch as it allows the pouch to depend naturally from one side of the secured-together main body portion. However, the Velcro-type or adhesive strips may be provided on opposite sides of the main body portion as shown in FIG. 40, which shows an embodiment in which the upper Velcro or adhesive strip 131 is on the opposite side and is, therefore, not visible. FIG. 40 also shows an additional flap 128 which forms a closure for the pocket 127 when the sanitary cover is wrapped about a shopping cart handle and used so that articles temporarily placed in the pouch, such as store coupons or the like, will not be lost. As shown, it is necessary and desirable in such case for the pouch to be sewn or attached to the main body portion at the top of the adhesive strip or Velcro strip 133 so that such edge can be folded over during use and the entire length attached to the upper strip rather than being partially covered by the pocket or pouch. Functionally, this amounts to the same thing as having both strips on the same side, but is more convenient to form or manufacture because the pocket or pouch material can be laid upon the main body portion preparatory to sewing the parts together with the Velcro-type fastening strip laid over the pouch and several sewing passes made to secure the several parts together. On the other hand, if the pouch material is sewn to the body portion with the pouch material laid so it extends essentially from one side, it is more difficult to maintain the two in alignment during sewing.

In FIG. 41, the preferred embodiment of the invention as shown in FIGS. 38 and 39 is shown in a side view similar to that shown in FIG. 39 with the main body portion secured together as shown in FIG. 38, except that the short section of the handle 123 of the shopping cart does not extend through the main body portion 121 of the sanitary wrapping, but instead, one arm 134 of the sanitary wrapping is folded over into the center while the other arm 135 continues to extend to the side. The flap 128 is hidden by the folded arm 134.

In FIG. 42, the embodiment of the invention shown in FIG. 41 as well as in FIGS. 38, 39 is shown with both of the arms 134 and 135 folded inwardly as partially shown in FIG. 41 and then in FIG. 43 with the entire upper section of the sanitary wrapping 121 folded inwardly into the pocket 127, leaving only a small upper portion of the sanitary wrapping as a whole extending from the pocket 127 together with the flap 128. The flap 128 may then be folded into the pouch 125 as shown in FIG. 43. As shown in FIG. 43, the folded sanitary wrapping of the invention is very compact and all possible contaminated surfaces are retained completely inside of the wrapping so that the wrapping can be very conveniently inserted into and carried in a purse or pocket for use as needed, merely by removing such sanitary wrapping from the purse or pocket, opening it out completely, as shown in FIGS. 39 and 40, and then attaching the main body portion 121 of the sanitary wrapping about a handle of a shopping cart as shown in FIG. 38. Of course, as an additional refinement, the disposable inside protective cover shown in FIGS. 28 through 31 could also be used within the main body portions 121 of the sanitary wrapping shown in FIGS. 38 through 43, but this is not normally necessary for the user to feel completely safe from any contamination.

The extending flaps 31 shown in FIGS. 5, 6 and 5B can also be easily incorporated onto the ends of the main body portion of the sanitary wrapping 141 shown in FIGS. 38 through 43 for extending over and shielding the sides of the handle of the shopping cart. Such side flaps can then be folded as shown in FIG. 5B and inserted together with the main body portion into the pouch 125 as shown in FIG. 43.

As in the embodiment of the invention shown in FIG. 2, the embodiment shown in FIGS. 38 through 43 is preferably closed with a Velcro-type fastening, but could also be adhered about the handle of a shopping cart by any other suitable self-adherent fastening or equivalent strength temporary adhesive.

FIG. 44 shows an isometric view of a second preferred embodiment of the invention for distribution particularly by stores on their premises. The embodiment of the invention shown in FIG. 44 includes an elongated essentially horseshoe-shaped plastic section 141 having outwardly inclined bottom opening pieces or sections 143. The central portion of the plastic member 141 is hollow and the material of such plastic member is resilient so that when the lower inclined open sections 143 are applied against a curved or round elongated section such as a shopping cart handle or the like, the inclined portions or sections 143 of the plastic member will tend to ride upon the surface of the round section and be forced apart until such round section passes into the hollow 147 within the interior of the plastic member 141, at which point the outer slanted sections 143 snap together again, encompassing the round section of the handle, as shown more particularly in FIGS. 45 and 48.

FIG. 45 shows a sanitary wrapping section such as shown in FIG. 44 applied to a handle section 145 of a shopping cart, as shown partially in phantom in FIG. 45. At the ends of the section 141, supports 146 for the handle 145 can be seen extending from the sanitary covering 141. The handle portion 145 in this particular embodiment of a shopping cart then turns upwardly into an upwardly extending curved portion or extension 147 of the shopping cart handle. After the shopping cart handle passes through the curvature 147, it then passes downwardly to connect with the main portion of the cart or basket, not shown.

In FIG. 46, there is shown an end view or cross-sectional view of the covering member 141 as shown in FIG. 44. The slightly inclined angle of the lower portions 143 of the opening is shown as well as the central hollow 147 within the resilient plastic covering.

FIG. 47 shows the resilient plastic covering 141 partially forced over a section 145 of a shopping cart handle, shown here in cross section. In FIG. 47, it can be seen how the slanted inside surface of the outwardly inclined bottom extensions of the resilient plastic covering 141 slide across the curved surface of a shopping cart handle 145 and urge the sides of the plastic section 141 apart.

FIG. 48 is a further cross-sectional view of the main body portion of the elongated resilient sanitary covering 141 completely snapped over the round shopping cart handle and with the shopping cart handle 145 accommodated in the hollow center 147 of the resilient section 141. The shopping cart handle 145 as shown in FIG. 48 fills only a part of the hollow interior 147 of the sanitary covering 141, but it will be understood that the relative dimensions of the sanitary covering 141 can be made so that the handle essentially fills the entire interior of the resilient section and is, in fact, preferably partially grasped by the sides of such section. As will be seen further in FIG. 61, discussed hereinafter, it may be advantageous to have the outer covering as closely encompassed about the handle 145 as possible so that other resilient members or coverings can be pressed or forced over the first resilient member until a series of such members or coverings are present to an extent such that no more can be forced over the earlier sanitary covers, at which point the employees of the store in which the cart is used will have to remove the earlier sanitary covers to allow the application of further sanitary coverings by customers to the shopping cart handles.

FIG. 49 shows an alternative embodiment of a sanitary covering 149 for the shopping cart handle 145 shown in phantom throughout most of the covering. It will be understood that the central portion of the covering 149 will be the same as shown in FIGS. 44 through 48 with the addition of end covering portions 151 which extend over the curved portions 147 of the handle 145. It should be understood also that the end portions 151 of the covering will not incorporate at the bottom the resilient clip arrangement shown in FIGS. 44 through 48, but will comprise openings that will conveniently fit over the ends of the handle of the shopping cart. It should also be understood that the end portions 151 will be designed to fit over the particular ends 147 of the handle 145 to substantially completely shroud or cover the handle and will assume a shape or inside dimensions which are appropriate to fit over the ends of the particular handles involved, the shape shown in FIG. 49 as well as some following figures being only designed to fit over the particular type of handles shown and not being the only shape possible.

FIG. 50 is a cross-sectional view of one of the end portions 151 of the shopping cart sanitary covering 149 in line with the handle of the shopping cart and shows how the non-gripping lower ends 152 of the end portions 151 extend merely downwardly and do not resiliently or grippingly contact or surround the sides of the handle 145 of the shopping cart as such handle extends downwardly. At the same time, it can be seen that the more inwardly resilient gripping sections 143 of the central portion of the protective cover 149 do extend inwardly and in effect, grip or at least surround the horizontal crosspiece 145a of the handle 145 of the shopping cart, not shown. Of course, if it were desired to have the lower portions 152 of the end portions 151 of the sanitary protective cover 149 contact the sides of the cart handle 145, such lower portions 152 would be designed to be resiliently urged inwardly so that they would make forceful contact with the sides of the handle 145.

FIG. 51 is a side view of a sanitary protective cover 149 similar to the protective cover shown in FIGS. 49 and 50 and shows diagrammatically certain printed advertising material applied to the surfaces of protective cover, such as, for example, the name of a grocery chain together with certain slogans of such chain imprinted upon the outside of the protective covering, not specifically shown, but shown diagrammatically, The central legend 154a, for example, might read "Grand Central", while the legends 154b might state "The Best Buys Always" and the legend 154c might read "Quality, Purity, Goodness". It will be understood that any other desired legend and name could be used to keep customers aware of the establishment providing the sanitary wrapping as well as such establishment's most notable characteristics or claims. It will also be understood that this protective covering can be provided to customers by the store involved to protect the handle of the shopping cart and may be either taken home by the customer and brought back to the store for consecutive use or may be recycled by the store for use by consecutive customers. There are commercial advertising advantages in allowing the customer to have his or her own personal protective covering for shopping cart handles having advertising of a particular store on it. Namely, most customers will not only be reminded to do their shopping at such store, but will be reluctant to take the protective covering to another store for use in such store, because of the variant name imprinted upon the covering itself. In addition to this, since different stores frequently have somewhat different designs and shapes of shopping carts, and particularly shopping cart handles, the protective cover for the handles of shopping carts in one store may frequently not fit the handles of shopping carts in another store, thereby encouraging the customers to continue to shop at the store where they originally obtained such cover. These two facts, namely (a) the name of the store imprinted upon the cover, and (b) the fact that the cover may be suitable only for the shopping cart handles of the store whose name is imprinted upon the protective cover, will naturally encourage customers to maintain a loyalty to the particular store where they obtained the protective cover for shopping cart handles. These two factors tending to encourage shopping at the store supplying the protective covers are additional to the primary factor that customers will tend to return to the store where they feel less contaminated in handling the shopping cart handles which have been already handled by numerous prior customers, some at least of whom may have been less than desirably clean and sanitary.

FIG. 52 is a side elevation of a further embodiment of the invention in which the sanitary covering for the shopping cart handle is formed from a series of individual plastic sections 153, the majority of which have a male interlock section 155 at one end which may be snapped together with a female connecting section located at the opposite end. The far end section 153a is provided only with a female interconnection opening section 159. See FIG. 53B described below.

FIG. 53A shows an end view of one of the sections 153 viewed toward the end from which the male interlock section 155 protrudes. It will be seen that both the overall section 153 and the male interlock section 155 are provided with a groove 157 in the bottom and a central opening 159 which will encompass the handle of the shopping cart during actual use.

FIG. 53B is an end view of one of the sections 153 viewed toward the end incorporating the female interlock member comprising essentially a larger orifice 161 into which the male interlock section 155 may fit, still leaving a groove 163 at the bottom through which the handle of the shopping cart, not shown, may be pressed. After the shopping cart handle has been inserted from the side or bottom into the sections 153, it occupies the central space or the central hollow 159 in the fittings 153 after having passed through the side walls of both the larger section 153, including both the openings 157 and 163. The side walls also accommodate or snap over one of the male interlock sections 155 and the bar of the shopping cart handle is itself accommodated in the central openings 159 and 161 of such sections.

Figure 54:
FIG. 54 is a side view in section of an alternative embodiment of the invention in which a sanitary covering shown wrapped about the central section of a shopping cart handle is formed of a series of tear sheets which may be removed serially from the handle to provide serially renewed sterile surfaces upon the handle portion.

FIG. 54 is a sectional view through a still further embodiment of the invention having the general outline of the protective sheath or cover 149 shown in FIGS. 49 and 51, but which is provided on the outside with a series of fairly thin plastic or compacted fiber sheets 165 wrapped about the central portion and adhered one to the other to form a layer of individually separatable sheets.

Figure 55:
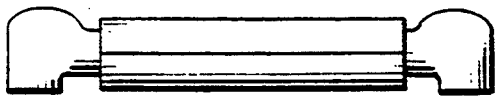
FIG. 55 is a side view of the embodiment of the invention shown in section in FIG. 51.

FIG. 55 is an elevation or outside view of the protective sheath shown in FIG. 54 showing the outside of the layer of protective sheets 165. In the embodiments shown in FIGS. 54 and 55, the protective cover 149, which will usually be provided by the store in which it is to be used, either interchangeably or permanently fixed over the horizontal crosspiece of the handle of such store's shopping carts, is provided with a series of fairly thin sheets, wrapped about the central portion of the protective sheath or cover in a manner such that each customer of the store may tear from the surface of the central portion of the sheath, one of the thin sheets 165 which may be discarded leaving the top surface of the next adhered sheet to use as the surface of the shopping cart handle or hand grip. In other words, each individual sheet provides a new and substantially sterile grasping or hand contact surface.

Figure 56:
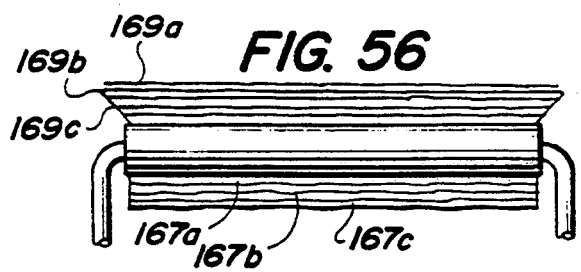
FIG. 56 is a side sectional view of an alternative embodiment of the invention shown in FIGS. 54 and 55 in which a series of sheets are adhered to each other about a shopping cart handle as in FIG. 54, but showing a slanted undercut at the upper ends of the mass of adhered sheets which is provided to facilitate removal of individual sheets after consecutive uses of the shopping cart.
Figure 57:
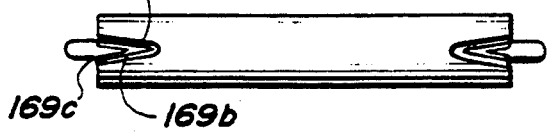
FIG. 57 is a top view of the embodiment of the invention shown in FIG. 56 partially cut away or sectioned to show the gradually increasing slanted central upper sections of the individual sheets which allows individual sheets to be removed to renew the surface of the sanitary protective cover.

FIGS. 56 and 57 show respectively, a sectional side view and a partially broken-away upper view of a still further embodiment of the invention in which a series of protective sheets are wrapped about the actual handle of a shopping cart, each sheet being effectively attached to the underneath sheet by a layer of releasable adhesive as shown essentially also in FIGS. 54 and 55 and provided with a series of differentially cutback portions which in the aggregate, extend farther and farther out to the side along the sheets from the bottom sheet to the top sheet and provide a series of undercut surfaces which the customer of a store can grasp to remove the outer sheet which has been used by a prior customer and discard it into a suitable trash or recycling receptacle or the like. The individual sheets are indicated by the reference numerals 167a, 167b, 167c, etc. in FIG. 56 and the cutback portions of each sheet are indicated by the reference numerals 169a, 169b, 169c and so forth in each of FIGS. 56 and 57. As will be noted, since each sheet progressing from the lowest to the highest extends in the cutback portions 169, a little closer to the nominal edge of the sheet, a user may place their finger under each of the sheets 167 and by exerting upward pressure, withdraw the top sheet from the pack. In order to prevent more than one sheet from being withdrawn, it is also advantageous to have the sheets attached to each other by means of differentially adherent adhesive layers. In other words, the very lowest sheet will be adhered to the handle of the shopping cart with an adhesive which is fairly retentive, while the next sheet will be adhered to the underlying sheet with an adhesive composition which is less retentive than the first adhesive composition. Likewise, the third sheet will be adhered to the underlying sheet by an adhesive which is differentially less retentive than the adhesive by which such sheet is retained to the underlying sheet. Thus, each sheet is adhered to the sheet immediately thereunder or ultimately to the shopping cart handle by an adhesive which has a formula calculated to make it less adhesive overall than the adhesive holding the sheet immediately thereunder to the sheet under that. Such arrangement prevents a series of sheets from being withdrawn when it is desired only to remove the top sheet or one sheet at a time. The differential adhesiveness of a basic adhesive may be provided for fairly simply by progressive dilution by a suitable diluent or an appropriate filler of the various batches which are used to adhere the various sheets to one another. All of said sheets should be, furthermore, adhered to each other by an adhesive which remains somewhat flexible and is both non-toxic and non-allergenic so that no adverse reactions will be suffered by either the user of the shopping cart who may contact portions of the adhesive or children associated with such user who may place their mouths upon the sanitary wrapping.

It has been found that thin plastic or paper sanitary coverings for shopping cart handles which may normally be dispensed from a roll or the like, such as shown, for example, in FIGS. 9 through 18, may have serious disadvantages when dispensed by stores or the like which may be frequented by customers with young children. The reason for this is that such young children, or a large percentage of such children, may have a habit of "mouthing" or chewing on the handles of shopping carts and may, in such circumstance, chew off and possibly swallow a thin piece of plastic or paper material which may be wrapped about the handle to protect it. It has been found, therefore, that where young children may have access to the protective wrappings, that such protective wrapping should have a more substantial character such that it cannot be chewed up and swallowed or otherwise broken off by a young child. Such added strength and durability is provided by the reusable-type of protective cover shown in FIGS. 44 to 51 as well as by the embodiments shown in FIGS. 52 and 53. In these arrangements or embodiments, the protective cover is formed from a substantial section of plastic or flexible plastic material which cannot be chewed off or bitten into by a young child. As mentioned above, however, such material should be made from a non-toxic plastic material so that no detrimental substances may be sucked out of it by a child.

The embodiments of the invention shown in FIGS. 54 through 57, while using relatively thin plastic material, furthermore, can be made quite suitable for use around young children if the adhesive between the pieces is sufficiently strong and durable to form a substantially monolithic deposit of plastic so far as being bitten through or torn off by the teeth of a young child.

In other words, the stack of thin sheets being adhered together by a suitable adhesive, even when such adhesive is differentially adhering from one sheet to the next, essentially provides, so far as a young child sucking or chewing upon such stacked sheets, a unitary thick piece of plastic. Of course, it is necessary in such instance, that the adhesive be suitable in order to give the effect desired. The embodiments of the invention shown in FIGS. 52 and 53 wherein separate sections of plastic coverings are snapped together to provide a unitary covering are also suitable for use around young children so long as the snapping together of the pieces is sufficiently secure so that a young child cannot pull off a section small enough to swallow. The sections are, of course, made of a plastic which is impossible to chew in the bulk in which it is supplied.

With respect to the embodiment of the invention shown in FIGS. 44 through 48, the very fact that the plastic is more substantial in order to provide sufficient strength to withstand destruction by mouthing or biting by young children also makes the protective covering more expensive and, therefore, frequently not suitable for simply throwing away after one use. However, there are several ways that such sections may be recycled. These include recycling with the normal household and industrial plastics in which a number of plastic items are collected and then melted together to provide a cheap amalgamation of plastic which may be suitable for various, less critical uses. However, since it is necessary for the plastic in the case of protective sanitary covers for shopping cart handles to be non-toxic, and to have a good strength and durability to prevent breakage and chewing by children, it is preferable not to mix it with other plastics to form a degraded type of cheap plastic which can be used for a number of uses. Rather, it has been found that it is much preferable to recycle the sanitary coverings shown in FIGS. 44 to 51 in a way in which such plastic is recycled only back into the same product. Where a sufficient number of markets or other stores, therefore, are using the same plastic protective coverings, all such plastic may be collected and then treated and recycled for reuse in the same product, i.e. a protective plastic covering for shopping cart handles, as it was used before. Such a recycling is shown in diagrammatic flow-sheet form in FIG. 58 in which a dispenser 171 attached to a wall 173 of a commercial establishment may dispense a series of sanitary protective covers 175 which, as shown, may be identical or similar to the embodiment of such covers shown in FIGS. 44 to 48. These sanitary covers 175 are snapped over the handle 177 of a shopping cart 179 by each customer who extracts one of the coverings 175 from the dispenser 171 for application to the handle 177. After use of the shopping cart 179, such cart will be left in a central position, as is the present custom, and will be collected by store personnel at which point the protective covers 175 will be removed from the handles and placed in a recycling receptacle 181 until there are sufficient to be collected by a truck 183 which conveys the plastic coverings 175 to be recycled to a plant where the covers may be placed in a furnace 185 to melt them down to a fluid or semi-fluid plastic which then may be directed to an extruder 187 which extrudes the molten plastic into new plastic protective covers 175a which are then directed to a warehouse 189 from which they may be dispensed by a delivery truck 191 back to the store premises where they are placed in a dispenser 171 for dispensing to further customers.

Alternatively, the collection truck 183 may deliver the plastic coverings to a plant where they are deposited into a washing or sanitizing device 193 where they are thoroughly cleaned by re-circulated antiseptic solution or the like before being dried and returned to the warehouse 189 for recycling back to the dispenser 171. As will be understood, the recycling, when done on a large scale, can be quite economical and will enable the plastic coverings to be reused in a perfectly clean condition at only a nominal cost per each use. The entire basis for the recycling shown in FIG. 55 is that it is a separate closed loop system in which the same product is recycled separately from other products so that it is not contaminated with the materials of other products and can be reconstituted exactly as it was before at a relatively low cost or expense. There is provided, therefore, a method of recycling adapted especially to the reuse of plastic protective covers for shopping cart handles which is adapted to accommodate large quantities of such handles from a number of different business establishments so that significant economies of scale can be effected. As will be understood, the recycled covers may be made so that they can accommodate advertising such as shown in FIG. 51 so that rather than the covering being taken home by the customer and then returned to the same store for reuse by the same customer, such plastic covering can be used once, recycled and then reused again by another customer after recycling. In this manner a very economical recycling operation including dispensing by stores themselves of sanitary covers becomes both practical and economical.

Figure 58:
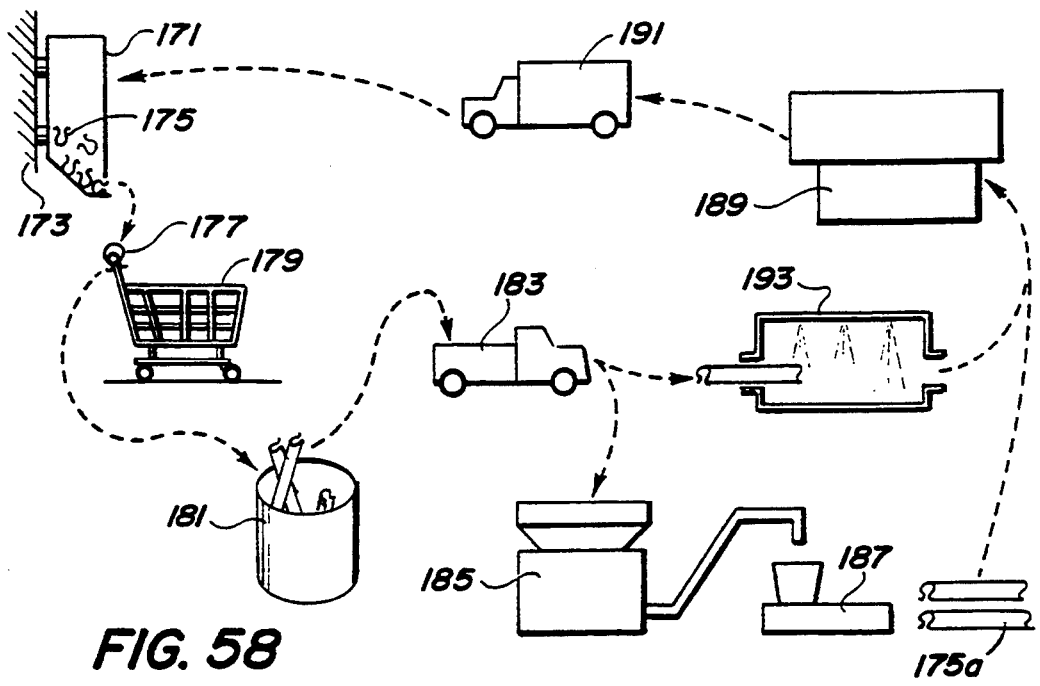
FIG. 58 is a diagrammatic flow diagram of a procedure for recycling sanitary protective covers such as shown in FIGS. 44 through 48.

While a preferred snap-type shield or covering for a shopping cart handle is shown being recycled in FIG. 58, it will be understood that any suitable type of sanitary wrapping or cover could be provided by a store, such as a flexible, Velcro-type fastening secured protective wrapping, and recycled in a process including sterilization or thorough washing in a suitable sanitizing operation such as, for example, one of those shown in FIG. 58.

Figure 59:
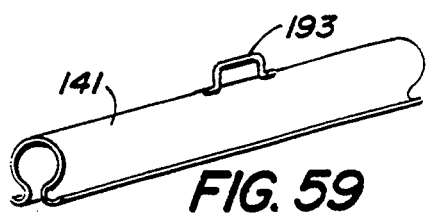
FIG. 59 is an isometric view of a sanitary cover in accordance with the invention as shown in FIGS. 44 through 48 having a handle on top of the sanitary protective covering to facilitate placement of said covering over a shopping cart handle or removal therefrom.

FIG. 59 is an isometric view of a variation of the plastic covering shown in FIG. 44, but including an extra handle 193 attached to the top by which the resilient plastic covering can be more easily forced over the shopping cart handle and removed.

Figure 60:
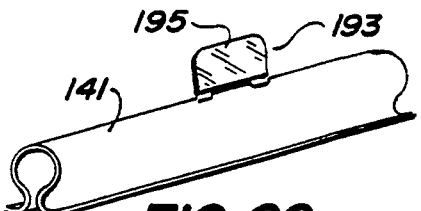
FIG. 60 is an isometric view of a sanitary protective covering with a handle such as shown in FIG. 59, but with the handle covered with a protective cover which may be breached when a new customer wishes to remove the previous sanitary covering from the shopping cart handle.

FIG. 60 shows a variation of the embodiment of the invention shown in FIG. 59 in which the handle 193 is covered by an outer plastic wrapping 195 which prevents contamination of the handle by the hands of previous users, but can be easily pierced by a second person who then may grasp the handle 193 and remove the plastic covering 195 from the shopping cart handle prior to placing a new and clean handle over such shopping cart handle.

Figure 61:
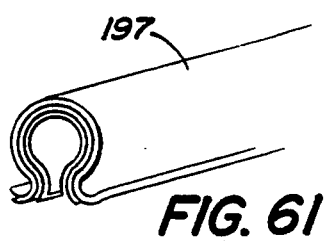
FIG. 61 is an isometric view showing a series of sanitary coverings similar to that shown in FIG. 44 through 48, but preferably formed of a somewhat more resilient or flexible material and having a more restricted cross section such that a series of sanitary coverings can be snapped first over a handle of a shopping cart and subsequently consecutively over the already-snapped-on sanitary coverings so that the original sanitary covering does not have to be removed before applying a second and subsequent coverings.

FIG. 61 shows a further embodiment of the invention, which, as explained briefly above, provides preferably somewhat thinner and more resilient plastic coverings 197 which may be placed over a shopping cart handle in the same manner as the embodiment shown in FIG. 44, but which may also accommodate a series of similar plastic coverings snapped over each prior plastic covering so that the handle and previous plastic coverings may be in turn covered or recovered by a new plastic covering by each customer. As will be understood, such sequential application of sanitary coverings 197 to the handle may continue through several cycles of use before the size or bulk of the accumulated covers on the shopping cart handle becomes sufficiently large so that no further covers can be placed over the top. At this point, the accumulated covers must be snapped off the shopping cart handle by store personnel and recycled in the normal manner as shown in FIG. 58.

As will be understood, there have been described above in connection with the present invention a number of different embodiments of basically similar sturdy plastic coverings for isolating a potentially contaminated handle of a shopping cart from the hands of the user in order to prevent contamination of such user's hand with potential disease organisms from a prior user with possibly detrimental health effects.

In the above specification and the claims appended hereto, the following terms should be understood to have the meanings indicated as follows:

"Sanitary wrapping", "sanitary covering" or "sanitary shielding" means a sheet material arranged and constructed to be temporarily wrapped or otherwise disposed about a handle of a shopping cart to generally prevent touching of such handle with the hands of a user of such cart.

"Sanitary secondary covering" or "secondary sanitary shield" means a sheet-type material arranged and constructed to be temporarily removably disposed within or along the bottom or inside of a sanitary wrapping means to protect the bottom of the sanitary wrapping or other sanitary covering material from actual contact with the handle of a shopping cart about which the sanitary wrapping may be placed.

"Biologically impervious" means, when applied to a sheet or other material, that living organisms or otherwise viable or infectious material such as bacteria, viruses, retroviruses, parasites and the like as well as body fluids or bodily derived fluids are unable to pass from one side to the other.

"Hand contact portion" means that portion of an object or apparatus such as the handle of a shopping cart or the like that is intended for normal contact with the human body and particularly the hands in order to guide and propel such cart or the like in a given direction.

"Contact contamination" means contamination or direct transfer of material by touching one surface including the surface of the human body with a second surface.

"Encapsulate" means to completely surround the circumference of a round or elongated member without necessarily completely covering or isolating such member such as, for example, a bar or handle of a shopping cart.

"Child-proof material" means a material which is substantially completely resistant to prolonged abuse by young children, is smooth and biologically impervious and is non-toxic when taken into the mouth of a young child.

As will be understood from the above, the present invention provides a simple and effective means for covering or shielding the handles of shopping carts and the like to prevent contamination of the user of such carts with disease or infectious residues left from previous users of the cart. Various improvements and alternative arrangements for the basic arrangement of a tubular or semi-tubular cover to be attached or placed over the shopping cart handle are disclosed.

While the present invention has been described at some length and with some particularity with respect to several described embodiments, it is not intended that it should be limited to any such particulars or embodiments or any particular embodiment, but is to be construed broadly with reference to the appended claims so as to provide the broadest possible interpretation of such claims in view of the prior art and, therefore, to effectively encompass the intended scope of the invention.

I claim:

1. A portable sanitary shielding means for preventing contact contamination of the human body as the result of direct contact with the handle of a shopping cart comprising:
    (a) a substantially rectangular flexible sheet of substantially biologically impervious material designed and constructed to have a length coextensive with that of at least a hand contact portion of a handle of a shopping cart, and a width such that the sheet, upon wrapping completely about the handle of such shopping cart, has an overlap of material at least sufficient to completely encapsulate said handle within said rectangular flexible sheet to form an encapsulating hand contact shield member,
    (b) a means for temporarily but effectively securing the biologically impervious sheet about the said handle in a manner such that the handle can be used for normal moving and guiding said cart without displacing the said flexible sheet from about said handle, (c) a pouch attached to one side of said rectangular flexible sheet in a position to depend from the rectangular sheet when secured about the handle of the shopping cart and having a size such that the rectangular sheet can be folded and inserted into said pouch when not in use as a protective shield over a shopping cart handle.

2. A sanitary shielding means according to claim 1 additionally comprising an extension of said rectangular flexible sheet beyond the hand contact encapsulating portion of said sheet arranged and constructed such that at least a portion of side support sections of the handle connecting the handle to the cart may be covered and prevented from direct contact with body parts, including the hands, of a user of the cart.

3. A sanitary shielding means according to claim 2 wherein the pouch is provided with a closure flap.

4. A sanitary shielding means according to claim 1 wherein the securing means comprises a self-sticking adhesive disposed along at least one longitudinal edge of said sheet material adapted to contact an opposite edge of said material.

5. A sanitary device according to claim 1 wherein the securing means is a hook-and-loop combination which detachably secures one edge of said encapsulating sheet to the other edge.

6. A sanitary shielding means according to claim 5 wherein the flexible encapsulating material is in the form of an inner padded section adjacent to an outer flexible material, the whole covered by a biologically impervious and child-proof material.

7. A sanitary shielding means for sanitizing a shopping cart handle comprising:
(a) a resilient plastic member having an elongated arcuate configuration with a hollow interior and resilient lips defining an opening having a lesser opening than the diameter of a shopping cart handle and a length substantially coincident with the length of the straight portion of a shopping cart handle,
(b) the resilient lips having inwardly inclined lower surfaces adapted to contact the sides of a shopping cart handle and facilitate forced movement of said lower surfaces outwardly and over said handle, and
(c) end sections attached to the resilient plastic member having an internal configuration arranged and constructed to enshroud any further outer end sections of the shopping cart handle.

8. A method of sanitizing the handle of a shopping cart with a recycled plastic shield means comprising:
(a) placing a biologically impervious plastic cover designed and adapted to shield the handle from human touch about said handle,
(b) securing the impervious plastic cover about said handle in a manner calculated to prevent accidental dislodgment of said plastic cover as the shopping cart is used and to avoid direct body contact with the portion of said handle over which the resilient cover sheet is placed,
(c) removing said plastic cover from over the handle and transporting said cover with other similar covers to a sterilization operation,
(d) returning the impervious plastic cover to a dispenser for removal as required to shield a shopping cart handle, and
(e) repeating steps (a) through (d) a plurality of times.

9. A method of sanitizing the handle of a shopping cart in accordance with claim 8 wherein the plastic cover is flexible and securing is accomplished by a temporary adhesive.

10. A method of sanitizing the handle of a shopping cart in accordance with claim 8 wherein the plastic cover is flexible and securing is accomplished by hook-and-loop type securing means which are brought together in intimate contact for securing.

11. A method of sanitizing the handle of a shopping cart in accordance with claim 8 wherein the plastic cover is resilient adapting it for a snap fit over a shopping cart handle.

12. A method of sanitizing the handle of a shopping cart in accordance with claim 11 additionally comprising initially withdrawing the biologically impervious resilient cover from a collection of said covers in a dispenser before passing it about the handle of the shopping cart.

13. A method of sanitizing the handle of a shopping cart in accordance with claim 8 wherein the securing is accomplished by magnetic means disposed along the inside of the impervious plastic cover means and interacting with a metallic cart handle.

14. A method of sanitizing the handle of a shopping cart in accordance with claim 11 wherein an impervious resilient plastic cover is the form of a resilient split tubular sheet form and is forcibly slipped over the handle means which it then resiliently grips.

15. A portable sanitary shielding means for preventing contact contamination of the human body as the result of direct contact with the handle of a hand-propelled cart comprising:
(a) flexible sheet means comprised of substantially biologically impervious material designed and constructed to have a length coextensive with that of at least a hand contact portion of a handle of a hand-propelled cart, and a width such that the sheet means, upon being wrapped completely about the portion of the handle of such cart, is at least sufficient to completely encapsulate said handle within said flexible sheet means to form an encapsulating hand contact shield member,
(b) a means for temporarily but effectively securing the biologically impervious sheet material about the said handle in a manner such that the handle can be used for normal moving and guiding said cart without displacing the said flexible sheet from about said handle,
(c) a pouch attached to one side of said flexible sheet means in a position to depend from the sheet means when secured about the handle of a hand propelled cart and having a size such that the sheet material forming the encapsulating hand contact shield member can be folded and inserted into said pouch when not in use as a protective shield over a hand-propelled cart handle.

16. A sanitary shielding means according to claim 15 additionally comprising an extension of said flexible sheet means beyond the hand contact encapsulating portion of said sheet means arranged and constructed such that at least a portion of any side support sections of the handle connecting the handle to the cart may be covered and prevented from direct contact with body parts, including the hands, of a user of the cart.

17. A sanitary shielding means according to claim 16 wherein the pouch is provided with a closure flap.

18. A sanitary device according to claim 15 wherein the securing means is a hook-and-loop combination which detachably secures one edge of said encapsulating sheet to the other edge.

* * * * *